(12) United States Patent
Orsini et al.

(10) Patent No.: US 9,284,078 B2
(45) Date of Patent: Mar. 15, 2016

(54) PACKAGING UNIT AND METHOD FOR PRODUCING SEALED PACKAGES

(71) Applicant: TETRA LAVAL HOLDINGS & FINANCE S.A., Pully (CH)

(72) Inventors: Ivan Orsini, Formigine (IT); Stefano Andreotti, Modena (IT); Marco Poppi, Modena (IT); Roberto De Pietri, Formigine (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 14/398,025

(22) PCT Filed: May 6, 2013

(86) PCT No.: PCT/EP2013/059326
§ 371 (c)(1),
(2) Date: Oct. 30, 2014

(87) PCT Pub. No.: WO2013/167502
PCT Pub. Date: Nov. 14, 2013

(65) Prior Publication Data
US 2015/0135649 A1    May 21, 2015

(30) Foreign Application Priority Data
May 11, 2012 (EP) ..................... 12167789

(51) Int. Cl.
*B65B 9/207* (2012.01)
*B65B 9/20* (2012.01)
(Continued)

(52) U.S. Cl.
CPC ............... *B65B 9/2056* (2013.01); *B29C 65/08* (2013.01); *B29C 65/7891* (2013.01);
(Continued)

(58) Field of Classification Search
CPC ...... B65B 9/12; B65B 9/2042; B65B 9/2049; B65B 9/207; B65B 51/30; B65B 61/24; B29C 65/18; B29C 65/3656; B29C 66/81463

USPC ............................................ 53/551, 451, 548
See application file for complete search history.

(56) References Cited

U.S. PATENT DOCUMENTS 3,325,961 A    6/1967  Lindh et al.
4,079,662 A *  3/1978  Puccetti ............... B65B 9/2014
                                                            493/203
(Continued)

FOREIGN PATENT DOCUMENTS

EP    1 162 143 A1    12/2001
EP    1 445 196 A1     8/2004
GB      686078 A       1/1953

OTHER PUBLICATIONS

International Search Report (PCT/ISA/210) mailed on Aug. 12, 2013, by the European Patent Office as the International Searching Authority for International Application No. PCT/EP2013/059326.

(Continued)

*Primary Examiner* — Gloria R Weeks
(74) *Attorney, Agent, or Firm* — Buchanan Ingersoll & Rooney PC

(57) ABSTRACT

A packaging unit for producing sealed packages from a tube of a sheet packaging material fed along a feed path having a first axis; unit comprises: jaws movable cyclically along path between a seal position in which they grip and seal tube to form sealing bands of packages, and a rest position in which they are detached from tube; and folding flaps fitted movably to jaws; folding flaps are movable between: an open position in which they are detached from tube, and a fully closed position in which they cooperate with tube for forming folded flaps in package; the jaws are also cyclically movable in an intermediate position, which is arranged between rest position and seal position; folding flaps are movable relative to the jaws into a partly closed position, which is arranged between open position and fully closed position, when the jaws are set in intermediate position.

19 Claims, 12 Drawing Sheets

(51) Int. Cl.
  *B29C 65/08* (2006.01)
  *B29C 65/00* (2006.01)
  *B65B 51/30* (2006.01)
  *B29C 65/78* (2006.01)
  *B29L 31/00* (2006.01)

(52) U.S. Cl.
  CPC .......... *B29C 66/1122* (2013.01); *B29C 66/346* (2013.01); *B29C 66/4312* (2013.01); *B29C 66/72328* (2013.01); *B29C 66/81463* (2013.01); *B29C 66/8226* (2013.01); *B29C 66/83543* (2013.01); *B29C 66/849* (2013.01); *B65B 9/207* (2013.01); *B65B 9/2049* (2013.01); *B65B 51/303* (2013.01); *B29C 66/71* (2013.01); *B29C 66/72321* (2013.01); *B29C 66/72341* (2013.01); *B29C 66/73921* (2013.01); *B29L 2031/7166* (2013.01)

(56) References Cited

U.S. PATENT DOCUMENTS

| | | | |
|---|---|---|---|
| 4,129,976 A | | 12/1978 | Gründler et al. |
| 5,155,980 A * | | 10/1992 | Mansson ............... B65B 9/2049 53/551 |
| 6,044,628 A * | | 4/2000 | Katayama et al. ............... 53/552 |
| 6,195,965 B1 * | | 3/2001 | Tobolka .................. B29C 65/18 493/218 |
| 6,357,203 B1 * | | 3/2002 | Cicha ........................ B31B 1/64 493/163 |
| 6,526,733 B1 * | | 3/2003 | Schellenberg et al. ......... 53/551 |
| 6,877,295 B1 * | | 4/2005 | Benedetti et al. ............... 53/451 |
| 7,299,608 B2 * | | 11/2007 | Kohl et al. ....................... 53/551 |
| 7,402,724 B2 * | | 7/2008 | Conover ........................... 800/3 |
| 7,441,391 B2 * | | 10/2008 | Lopparelli et al. .............. 53/551 |
| 8,402,724 B2 * | | 3/2013 | Cecil ....................... B29C 65/02 53/374.6 |
| 8,407,974 B2 * | | 4/2013 | Fontanazzi et al. ............. 53/551 |
| 8,607,535 B2 * | | 12/2013 | Karlsson et al. ................ 53/451 |
| 8,919,081 B2 * | | 12/2014 | Andreotti et al. ............... 53/451 |
| 2001/0049920 A1 | | 12/2001 | Yamamoto et al. |
| 2004/0266305 A1 * | | 12/2004 | Bergholtz ............... B32B 27/12 442/394 |
| 2009/0019819 A1 * | | 1/2009 | Karlsson et al. ................ 53/551 |
| 2013/0227918 A1 * | | 9/2013 | Paradisi .................... B65B 9/12 53/551 |

OTHER PUBLICATIONS

Written Opinion (PCT/ISA/237) mailed on Aug. 12, 2013, by the European Patent Office as the International Searching Authority for International Application No. PCT/EP2013/059326.

* cited by examiner

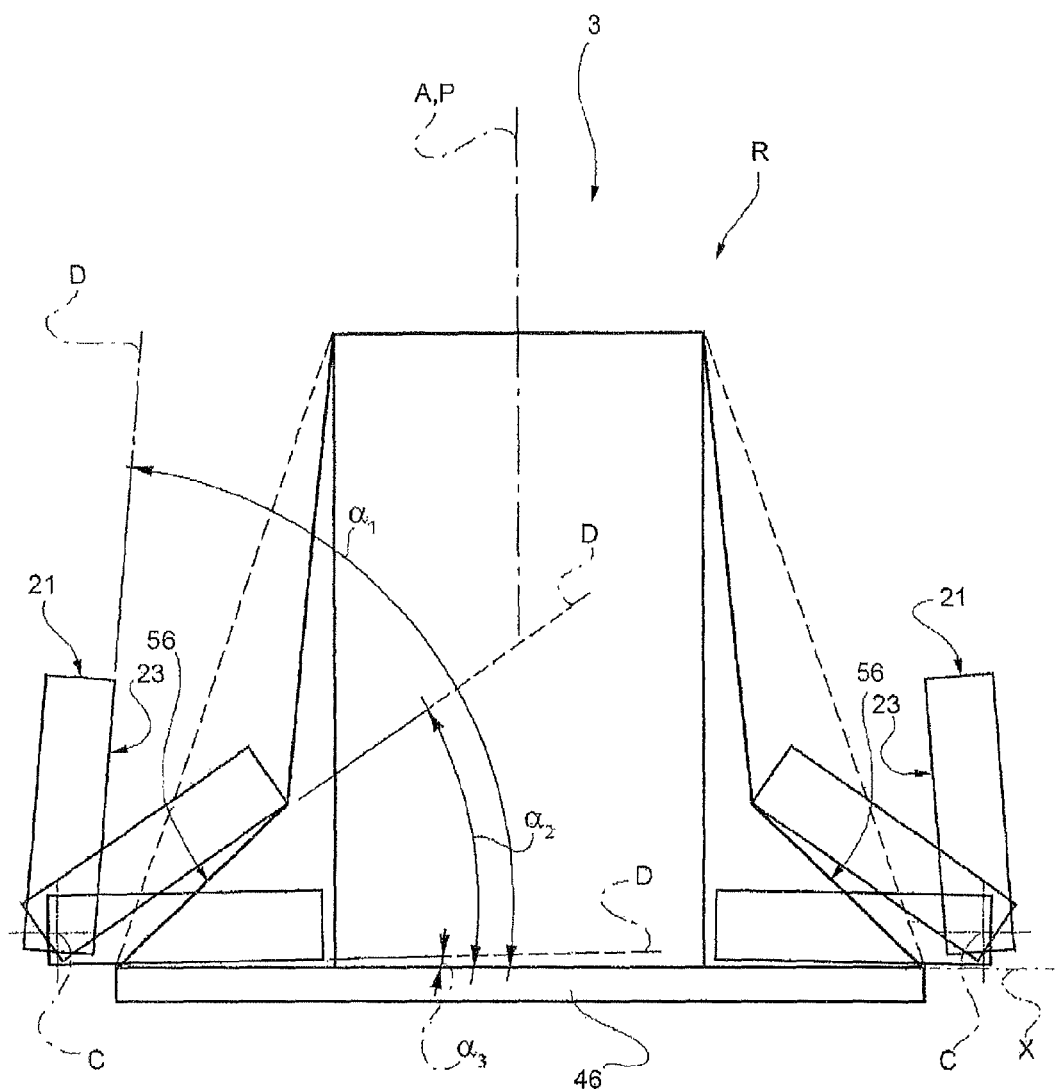

PACKAGING UNIT AND METHOD FOR PRODUCING SEALED PACKAGES

TECHNICAL FIELD

The present invention relates to a packaging unit for producing sealed packages from a tube of a sheet packaging material.

The present invention also relates to a method of producing sealed packages from a tube of a sheet packaging material.

BACKGROUND ART

Many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated band packaging material.

The packaging material has a multilayer structure substantially comprising a base layer for stiffness and strength, which may be defined by a layer of fibrous material, e.g. paper, or mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

As is known, packages of this sort are produced on fully automatic packaging units, on which a continuous tube is formed from the web-fed packaging material; the web of packaging material is sterilized in the packaging unit, e.g. by applying a chemical sterilizing agent such as a hydrogen peroxide solution, which is subsequently removed, e.g. by heating and evaporation, from the surfaces of the packaging material.

The sterilized web is maintained in a closed, sterile environment, and is folded into a cylinder. In particular, the opposite lateral edges of the cylinder are overlapped and sealed to form a longitudinal sealing band of the tube.

The tube is fed in a vertical direction parallel to its axis, and is filled continuously with the sterilized or sterile-processed food product.

Packaging units are known which interact with the tube to heat seal it at equally spaced cross sections to form a series of pillow packages connected to one another and by transverse sealing bands, i.e. extending in a direction perpendicular to the feed direction of the tube.

More specifically, the unit comprises two forming assemblies movable along respective runners and which interact cyclically and successively with the tube to heat seal the packaging material of the tube.

Each forming assembly comprises a slide movable back and forth along the respective runner; and two jaws hinged at the bottom to the respective slide, and movable between a seal position cooperating with the tube to heat seal it, and a rest position detached from the tube.

The movements of the forming assemblies are offset by a half-period: the slide of one forming assembly moves upwards with its jaws in the rest position, as the slide of the other forming assembly moves downwards with its jaws in the seal position to prevent collision and interference.

The jaws of each forming assembly have respective sealing members which cooperate with opposite sides of the tube and comprise, for example, a heating member, and an elastomeric member for providing mechanical support to grip the tube to the required pressure.

Each forming assembly also comprises two forming members comprising respective forming half-shells hinged to the respective jaws.

Each pair of forming half-shells moves cyclically between an open position detached from the tube, and a closed position contacting the tube to fold it between two consecutive sealing sections and so define and control the volume of the package being formed.

More specifically, the sealing members of a first forming assembly seal the package at a bottom sealing band thereof, and the half-shells of the first forming assembly control the volume of the package being formed, and the sealing members of the second forming assembly seal the package at top sealing band thereof.

Known packaging unit also comprises, as shown for example in EP-A-1445196, for each forming assembly, a pair of folding flaps movably fitted to one of the jaw of the corresponding forming assembly and adapted to form triangular flaps at the bottom corners of the pillow packages.

In particular, when the jaws of each forming assembly are in the respective seal position, the relative folding flaps move between:

an open position, in which they are detached from the tube; and a closed position, in which they cooperate with the tube, so as to form the triangular flaps at the bottom corners of the pillow packages.

In other words, the folding flaps move for the same angle both:

from the open position to the closed position before that the sealing band is formed; and from the closed position to the open position, once that the sealing band is formed so as to release the formed package.

Though highly reliable and efficient, the above-described packaging unit leave room for further improvement.

As a matter of fact, increasing use is made of ultrasonic sealing devices, which substantially comprise a mechanical-vibration generator or sonotrode and an anvil—known for example from EP-B-615907 in the name of the same Applicant—fitted to respective jaws of each pair and which cooperate with each other to heat the packaging material by means of ultrasonic vibrations.

Ultrasonic sealing device are especially used when the packaging unit is required to form packages with no layer of aluminium or other electrically conductive materials.

When the ultrasonic sealing device is used, the sealing members of the first forming assembly move further downward, with respect to the sealing members of the second sealing assembly, after that the transversal sealing band is formed, in order to avoid interference.

This further downward movement may induce stretching on the formed package, which has its top sealing band still retained by the sealing members of the second sealing member, and its bottom sealing band and triangular flaps potentially interfering with the folding flaps of the sealing member of the first folding assembly, especially when the packaging material is stiff.

As a result of this tendency and of the prolonged stretching action, there is thus the risk that the folding flaps in the open position could collide with the triangular flaps of the package in formation, thus causing the package to swing or to be damaged.

The Applicant has recognized that, in order to avoid this collision, the optimal solution would be moving the folding flaps for a higher first angle between the closed position and the open position, thus mitigating the risk of interference with the transversal sealing band and the triangular flaps.

However, this higher first angle between the closed position and the open position could generate some drawbacks, when the folding flaps move from the open position to the closed position and when the sealing members close on the tube to form the transversal sealing bands.

As a matter of fact, the Applicant has also recognized that a smaller second angle between the open position and closed position of the folding flaps would be optimal to contain the risk that the tube of packaging material twists about it own axis when the sealing members close on the tube to form the transversal sealing bands.

This twisting could render unstable the overlapping of the edges of tube intended to form the longitudinal sealing band, during the formation of this longitudinal sealing band of the tube.

Furthermore, a smaller second angle between the open position and the closed position of the folding flaps would be optimal for holding the tube during the formation of the package, thus avoiding the risk of cracking the areas of the packaging material close to the transversal sealing bands and/or the bending of opposite lateral edges of the transversal sealing bands.

A need is felt within the industry to obtain a packaging unit which is particularly flexible as regards to the movement of the folding flaps between the relative open positions and closed positions, so as to properly form, for example, packages from particularly stiff packaging material and/or by using ultrasonic sealing device for forming the transverse sealing bands.

It is an object of the present invention to provide a packaging unit for producing sealed packages from a tube of a sheet packaging material, designed to meet the above requirements in a straightforward, low-cost manner.

DISCLOSURE OF THE INVENTION

According to the present invention, there is provided a packaging unit for producing sealed packages, as claimed in claim 1.

According to the present invention, there is also provided a method for producing sealed packages, as claimed in claim 11.

BRIEF DESCRIPTION OF THE DRAWINGS

A preferred, non-limiting embodiment of the present invention will be described by way of example with reference to the accompanying drawings, in which:

FIG. 12 schematically shows the folding action carried out by some components of the unit of FIGS. 1 to 9.

BEST MODE OF CARRYING OUT THE INVENTION

Figure 1:
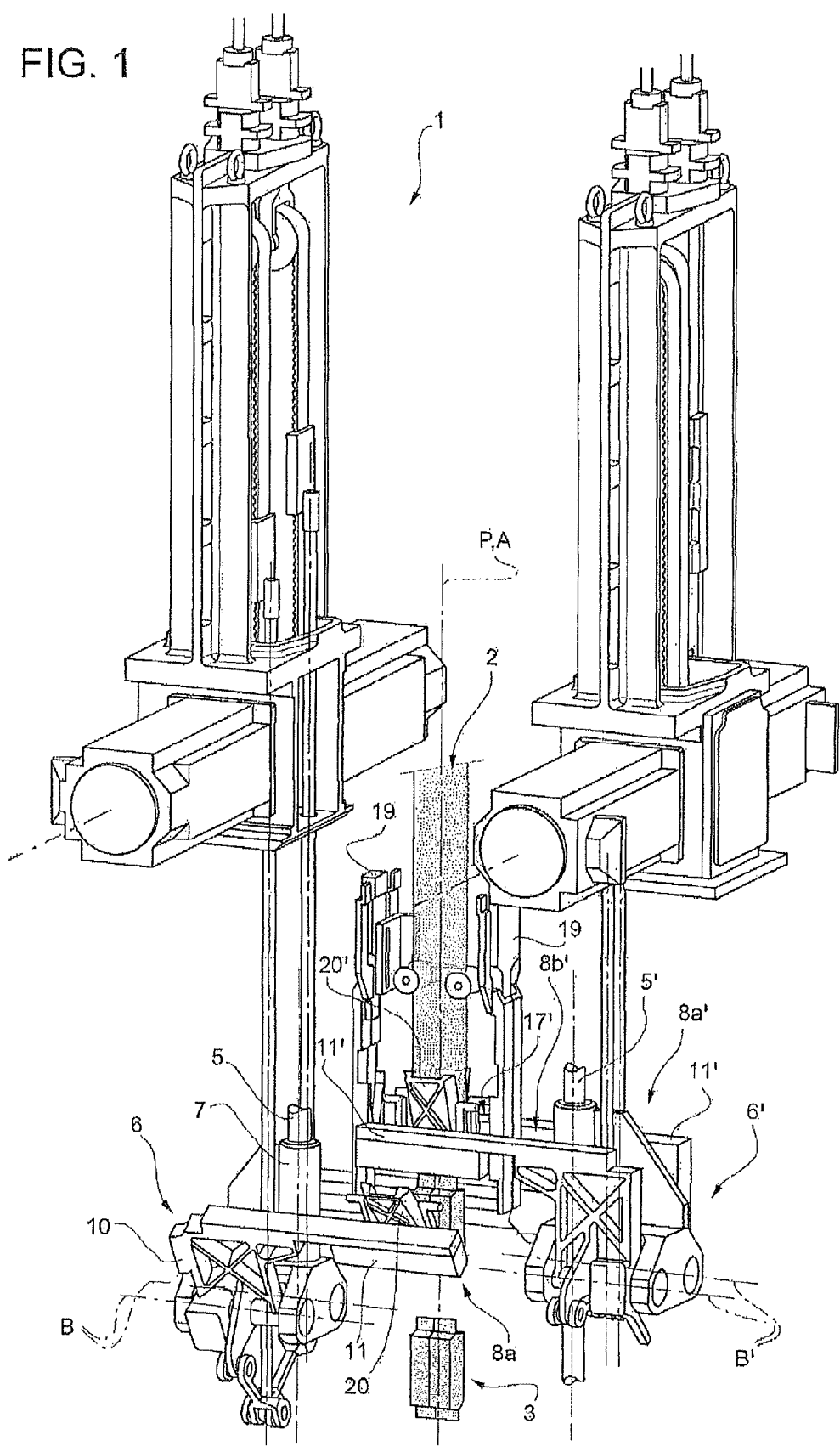
FIG. 1 shows a view in perspective, with parts removed for clarity, of a packaging unit for producing packages of a food product pourable into a tube of packaging material.

Number 1 in FIG. 1 indicates as a whole a packaging unit for producing sealed packages 3 (FIGS. 1, 11 and 12) of a food product from a tube 2 of sheet packaging material.

Unit 1 preferably produces sealed packages 3 of a pourable food product, such as pasteurized or UHT milk, fruit juice, wine, etc.

Unit 1 may also produce sealed packages 3 of a food product which is pourable into tube 2 when producing packages 3, and sets after packages 3 are sealed. One example of such a food product is a portion of cheese, which is melted when producing packages 3, and sets after packages 3 are sealed.

The packaging material has a multilayer structure (not shown) and comprises a layer of fibrous material, normally paper, covered on both sides with respective layers of heat-seal plastic material, e.g. polyethylene. In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of package 3 eventually contacting the food product.

Tube 2 is formed in known manner by longitudinally folding and sealing a web (not shown) of heat-seal sheet material, is filled by a fill pipe (not shown) with the sterilized or sterile-processed food product for packaging, and is fed, in known manner not shown, along a vertical path P having a vertical portion indicated by an axis A in FIG. 1.

Figure 11:
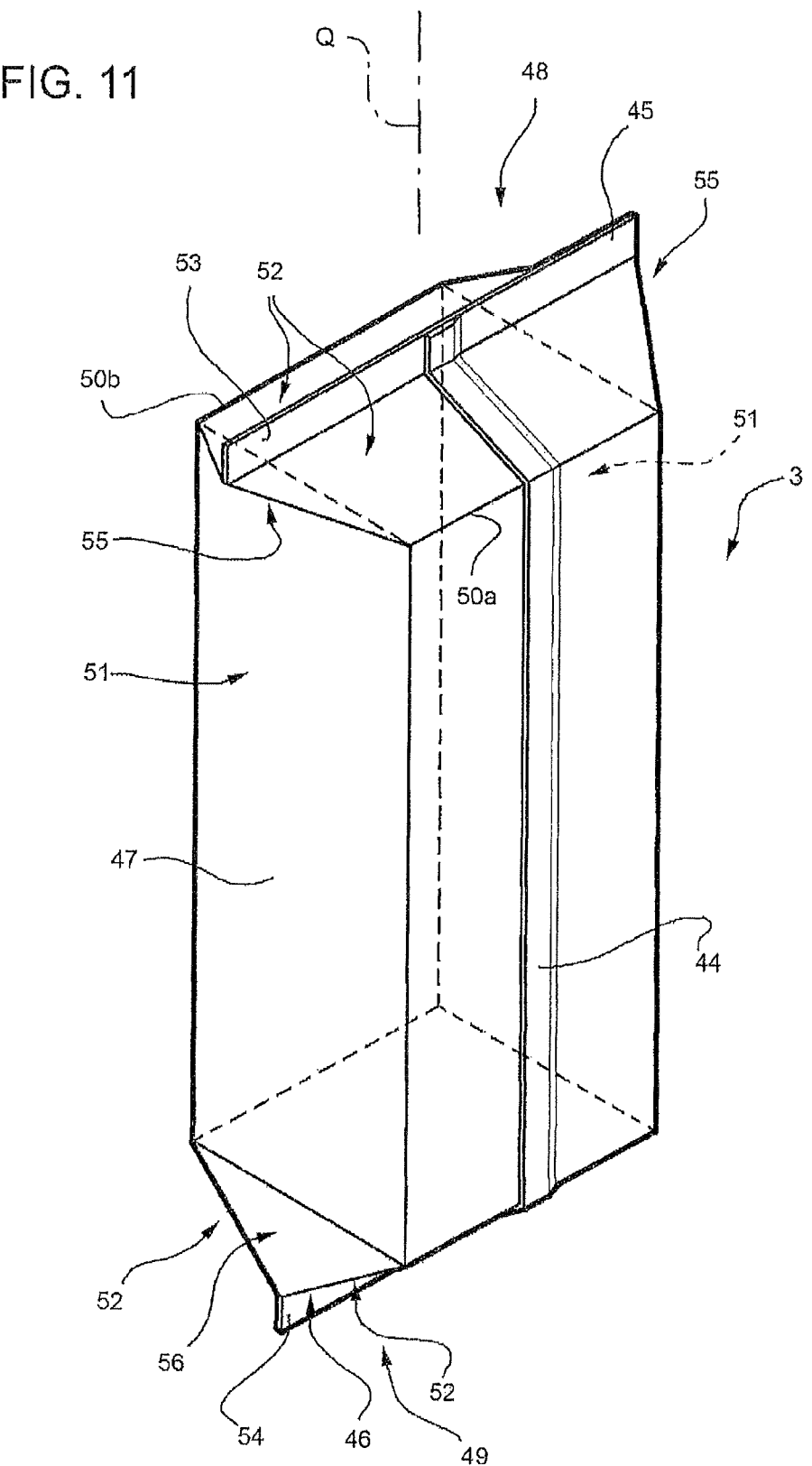
FIG. 11 shows a package formed by the unit of FIGS. 1 to 10.

Unit 1 comprises two forming assemblies 6, 6' which move along respective vertical cylindrical runners 5, 5' symmetrical with respect to axis A, and interact cyclically with tube 2 to grip and heat seal it along respective equally spaced cross sections crosswise to axis A, to form a number of pillow packages 3 (FIG. 11).

With reference to FIG. 11, a longitudinal sealing band 44, formed to produce tube 2 of packaging material from the web folded into a cylinder, extends along one side of each package 3, which is closed at the opposite ends by respective transverse sealing bands 45, 46 perpendicular to and joined to longitudinal sealing band 44.

Each package 3 has an axis Q parallel to a main portion of longitudinal sealing band 44, and comprises a parallelepiped-shaped main portion 47; and opposite, respectively top and bottom, end portions 48, 49 tapering from main portion 47 towards respective transverse sealing bands 45, 46.

More specifically, main portion 47 of each package 3 is bounded laterally by two flat rectangular walls 50a, 50b parallel to each other and to axis Q, and by two flat rectangular walls 51 extending perpendicularly between walls 50a, 50b.

Each end portion 48, 49 is defined by two walls 52, each substantially in the form of an isosceles trapezium, and which slope slightly towards each other with respect to a plane perpendicular to axis Q, and have minor edges defined by respective end edges of walls 50a, 50b of portion 47, and major edges joined to each other by respective sealing band 45, 46.

As shown clearly in FIG. 11, longitudinal sealing band 44 extends between transverse sealing bands 45 and 46, and along the whole of one wall 50a, 50b and the corresponding walls 52 on the same side as wall 50a, 50b.

Each sealing band 45, 46 forms a respective substantially elongated rectangular end tab 53, 54 projecting in the direction of axis Q from relative package 3.

Furthermore, each sealing band 45, 46 form two substantially triangular flaps 55, 56 projecting laterally on opposite sides of main portion 47 and defined by end portions of relative walls 52 and by corresponding triangular end portions of walls 51.

In particular, flaps 55, 56 are arranged at the top of bottom corners of each package 3.

Being known and identical, only one of assemblies 6, 6' (assembly 6) is described below, identical or corresponding parts of assemblies 6, 6' being indicated in the drawings using the same reference numbers.

Assembly 6 (FIGS. 1 and 2) substantially comprises:
- a slide 7 which runs up and down respective runner 5 in a direction parallel to axis A; and
- two jaws 8a, 8b which are hinged at the bottom to slide 7 about respective horizontal axes B perpendicular to axis A and are located on opposite sides of tube 2.

In detail, jaws 8a, 8b rotate about respective axes B between:
- a seal position in which they grip and seal tube 2;
- one or a plurality of intermediate position; and
- a rest position (shown in FIGS. 1 and 2), in which they are furthest away from tube 2, and in which corresponding points of the jaws 8a, 8b are furthest apart in a direction perpendicular to axis A.

Jaws 8a, 8b stop both in the seal position and in the rest position.

In the embodiment shown, jaws 8a, 8b do not arrest in any one of the intermediate positions, but simply slow down at a plurality of the intermediate position.

Alternatively, jaws 8a, 8b could stop in a given intermediate position.

The reciprocating movement of slides 7 and opening/closing movement of jaws 8a, 8b are controlled, in known manner not described, by pairs of vertical rods (not described in detail in the present description) in turn controlled by rotary cams or servomotors.

Jaws 8a, 8b therefore perform a translatory movement parallel to axis A by virtue of the up and down movement of slide 7; and an opening and closing movement onto tube 2 of packaging material by rotating about respective hinge axes B with respect to slide 7, and which is superimposed on the vertical up and down translatory movement of slide 7.

More specifically, each jaw 8a, 8b comprises:
- a base portion 10 hinged at its bottom end, about respective axis B, to a bottom portion of slide 7; and
- an arm 11 which interacts with tube 2, is connected to portion 10, and extends along a direction Z which is perpendicular to axis A.

Jaws 8a, 8b (8a', 8b') travel along respective paths in offset manner, so that arms 11 (11') of jaws 8a, 8b (8a', 8b') moving down along sealing stroke in the seal position pass between arms 11' (11) of jaws 8a', 8b' (8a, 8b) moving back up along return stroke in the rest position.

Figure 2:
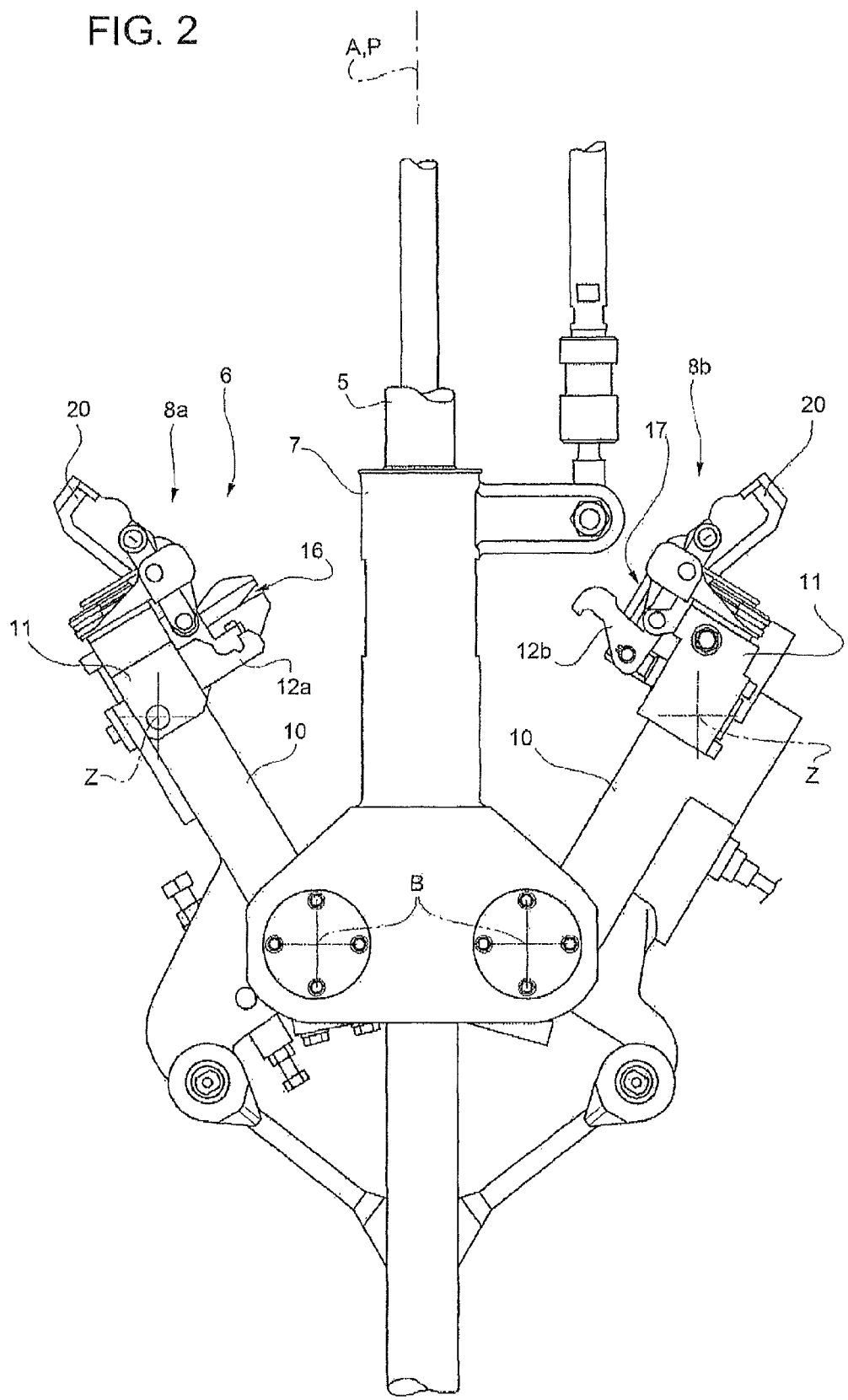
FIGS. 2 to 5 show in a larger-scale respective components of the unit of FIG. 1 unit.

Assembly 6 also comprises a first fastener 12a fitted integrally to one end of arm 11 of one of jaws 8a, 8b; a second fastener 12b hinged to one end of arm 11 of the other jaw 8a, 8b about an axis parallel to axes B; and a hydraulic cylinder for gripping first and second fasteners 12a, 12b in an engaged position to keep jaws 8a, 8b in the seal position (FIG. 2).

Figure 3:
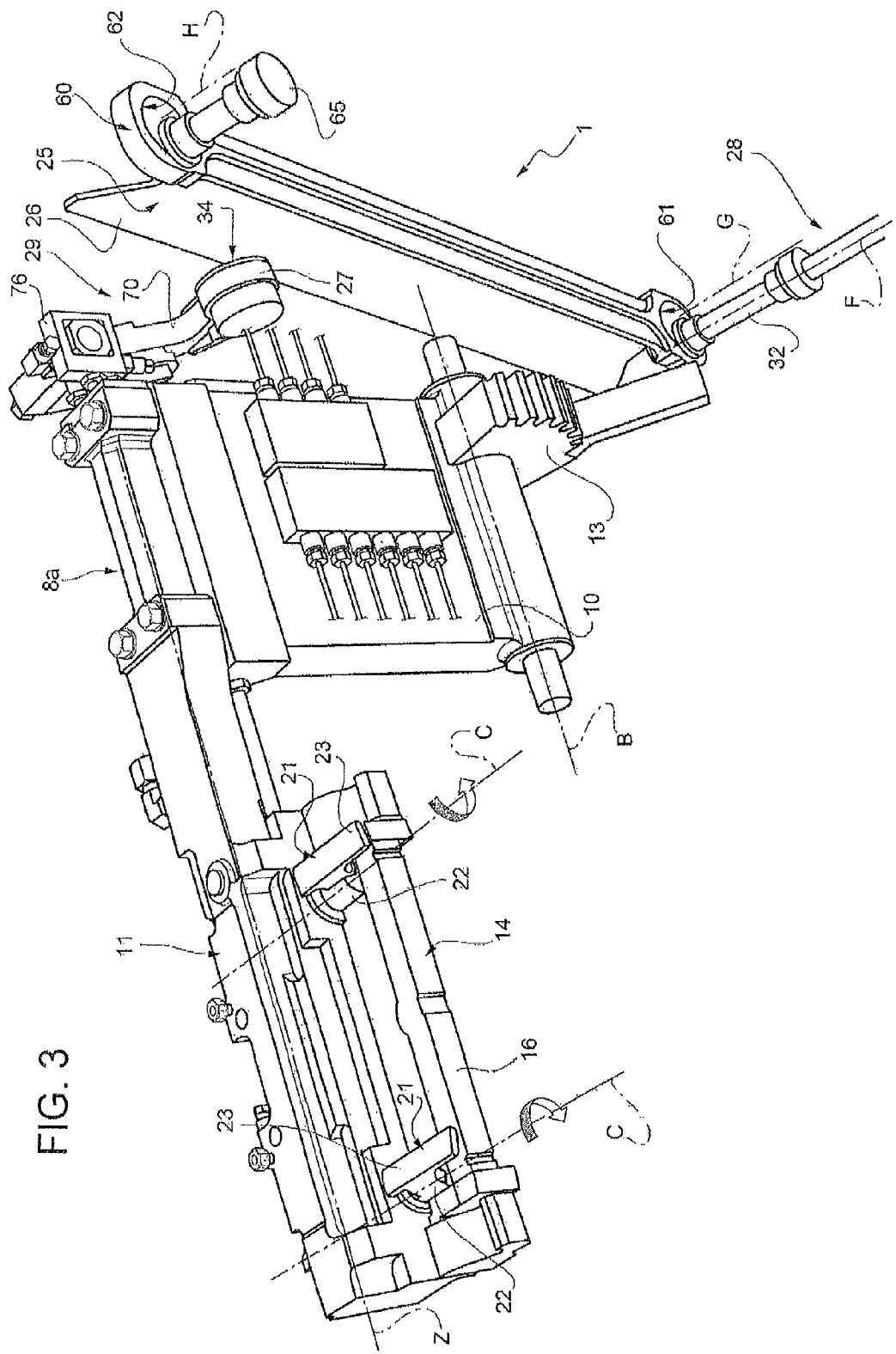

Portions 10 of jaws 8a, 8b comprise respective sector gears 13 (shown only in FIG. 3) mutually meshing to ensure jaws 8a, 8b rotate by the same angle about respective axes B between the closed and open position.

Assembly 6 also comprises a known sealing device 14, for heat sealing each cross section of tube 2 of packaging material gripped between relative jaws 8a, 8b to form one of sealing band 45, 46.

In detail, sealing device 14 of one assembly 6 forms sealing band 46 at the bottom of package 3 in formation, while the sealing device 14 of the other assembly 6' forms sealing band 45 at the top of package 3 in formation.

Sealing device 14 substantially comprises a mechanical-vibration generator or sonotrode 16 fitted to arm 11 of jaw 8a, and which interacts with tube 2; and an anvil 17 fitted to arm 11 of jaw 8b, and which cooperates with respective active surfaces of sonotrode 16 to grip and heat seal tube 2 (FIG. 2).

Assembly 6 also comprises two forming half-shells 20 (FIGS. 1 and 2) facing each other on opposite sides of axis A and hinged to respective jaws 8a, 8b about respective axes parallel to axes B.

As jaws 8a, 8b travel along the respective paths, half-shells 20 perform a work cycle comprising:
- a closing stroke, in which they are moved by two cams 19, from an open position in which they are detached from tube 2 to a closed position in which they cooperate with tube 2;
- a volume-control stroke, in which half-shells 20 cooperate with tube 2 in the closed position; and
- a return stroke, in which half-shells 20 are moved in the open position, by not-shown springs.

Cams 19 (FIG. 1) located on opposite sides of axis A, extending along axis A and interacting with respective rollers fitted to half-shells 20.

Assembly 6 also comprises a pair of flaps 21 (FIGS. 3, 6, 7, 8, 9 and 12) fitted movably to jaw 8a, located on either side and adjacent to tube 2, and symmetrical with respect to axis A.

More specifically, flaps 21 comprise:
- respective pins 22 fitted in a rotary manner about respective axes C through respective holes formed into jaw 8a; and
- respective tabs 23 projecting integrally from pins 22 and which comprise respective flat surfaces interacting with the packaging material of tube 2.

More specifically, tabs 23 project from relative ends of pins 22 facing tube 2, and so project form relative arm 11 of jaw 8a on the same side as relative sonotrode 16.

Flaps 21 also comprise (FIG. 10) a pair of respective pins 24 projecting from pins 22 from the side of arm 11 opposite to tube 2 and extending eccentrically about relative axes C.

Axes C are parallel to each other and substantially orthogonal to extension direction Z of arm 11.

Flaps 21 are movable back and forth between:
- an open position (shown in FIG. 6) in which they are detached from tube 2; and
- a fully closed position (shown in FIG. 9) in which they grip tube 2 and form flaps 56 of each package 3.

Flaps 21 are advantageously movable relative to jaws 8a, 8b in a partly closed position (FIG. 8) which is intermediate between the open position and fully closed position; flaps 21 are movable in the partly closed position, when jaws 8a, 8b are set in the intermediate position.

In detail, flaps 21:
- are arranged in the open position and move together with jaws 8a, 8b, when jaws 8a, 8b move from the rest position to the intermediate position;
- move relative to jaws 8a, 8b from the open position to the partly closed position but not yet contact tube 2, when jaws 8a, 8b are in the intermediate position;
- remain in the partly closed position and move together with jaws 8a, 8b, when jaws 8a, 8b move from the intermediate position to the seal position;

contact tube 2 in the partly closed position before that jaws 8a, 8b have reached the seal position, so as to control the shape and/or the orientation of tube 2 and in particular to prevent tube 2 from twisting about axis A;

move relative to jaws 8a, 8b from the partly closed position to the fully closed position, after that jaws 8a, 8b have reached the seal position, so as to form flaps 56; and move relative to jaws 8a, 8b from the fully closed position the open position, when jaws 8a, 8b are still in the seal position.

Due to the fact that jaws 8a, 8b do not stop in the intermediate position, flaps 21 move from the open position to the partly closed position, when jaws 8a, 8b are moving from the rest position to the seal position.

In particular, flaps 21 stop in anyone of the open position, partly closed position and fully closed position.

In other words, the movement of flaps 21 is discrete.

With reference to FIG. 12, tab 23 of each flap 21 extends along a direction D which forms with a direction X orthogonal to axis A:

- an angle $\alpha_1$ (the projection of which in a plane R defined by arms 11 of jaws 8a, 8b in the seal position and axis A is shown in FIG. 12) when flaps 21 are in the open position and jaw 8a, 8b are in the seal position; and
- an angle $\alpha_2$ (the projection of which shown in the plane R is shown in FIG. 12) smaller than angle $\alpha_1$, when flaps 21 are in the partly closed position and jaws 8a, 8b are in the intermediate position.

Angle $\alpha_2$ ranges between 50 and 56 degrees and is preferably 51 degrees. Angle $\alpha_1$ ranges between 77 and 82 degrees and is preferably 77 degrees.

Directions D, X form an angle $\alpha_3$ (see FIG. 12) of about 1 degree, when flaps 21 are in the fully closed position and jaws 8a, 8b are in the seal position.

In particular, angle $\alpha_3$ is not null, i.e. direction D is not perfectly orthogonal to axis A, due to the thickness of the packaging material.

Due to the fact that flaps 21 move from the open position to the partly closed position when jaws 8a, 8b move from the rest position to the intermediate position, angles $\alpha_1$, $\alpha_2$ do not lie on plane R.

Due to the fact that flaps 21 move into the closed position, when jaws 8a, 8b are in the seal position, angles $\alpha_3$ lie on plane R.

Directions D are orthogonal to axes C of respective flaps 21.

In order to move flaps 21 from the open position to the partly closed position, and from the partly closed position to the open position, unit 1 comprises (FIGS. 3 to 10):

- an adjustable cam 25 comprising a flat surface 26 which is adapted to interact with a cam follower 27 operatively connected to flaps 21;
- a device 28 for moving cam 25 along direction X perpendicular to path P, thus causing flaps 21 to move from the open position to the partly closed position and from the partly closed position to the fully closed position; and
- a mechanism 29, which converts the rotation of cam follower 27 about an axis L into equal opposite rotations of flaps 21 about respective axes C, so that flaps 21 are moved commonly and symmetrically with respect to path P.

With reference to FIGS. 3 to 8, cam 25 extends substantially parallel to axis A, vertically in the embodiment shown.

Cam 25 is movable along direction X back and forth between:

- a first position (shown in FIG. 6) in which it is detached from cam follower 27 along direction X and in which flaps 21 are in the open position;
- a second position (shown in FIG. 8) in which it cooperates with cam follower 27 and in which flaps 21 are arranged in the partly closed position; and
- a third position (shown in FIG. 9) in which it cooperates with cam follower 27 and in which flaps 21 are arranged in the fully closed position.

Direction X is, in particular, orthogonal to surface 26.

In particular, the movement of cam 25 is discrete, i.e. cam 25 stops in anyone of the first position, the second position and the third position.

Device 28 comprises (FIG. 5):

- a motor 30 having an output shaft 31;
- a shaft 32 elongated along an axis F orthogonal to path P and direction X and driven in rotation about axis F by motor 30; and
- a belt 33 interposed between a output shaft 31 and a first axial end of shaft 32.

In detail, output shaft 31 extends along and rotates about an axis which is parallel to and staggered from axis F.

Device 28 also comprises a rod 60 which is operatively connected to cam 25, to shaft 32 and to a rod 65 which is fitted to a fixed part of unit 1.

In detail, device 28 converts the rotation of shaft 32 about axis F into the translation back and forth of cam 25 along direction X.

Rod 60 is elongated along axis A and comprises a pair of disks arranged at respective opposite axial ends of rod 60.

Disks of rod 60 define:

- a pair of respective circular surfaces 61, 62 (FIGS. 3 and 4) arranged on the side of motor 30 and extending about respective axes G, H; and
- a pair of respective circular surfaces 63 (FIG. 4) arranged on the opposite side of motor 30 and which extend about respective axes I.

Surface 61 is engaged by a second axial end of shaft 32 opposite to motor 30 and axis G is staggered from and parallel to axis F.

Surface 62 is engaged by rod 65. Rod 65 extends along an axis staggered from and parallel to axis H.

Figure 4:
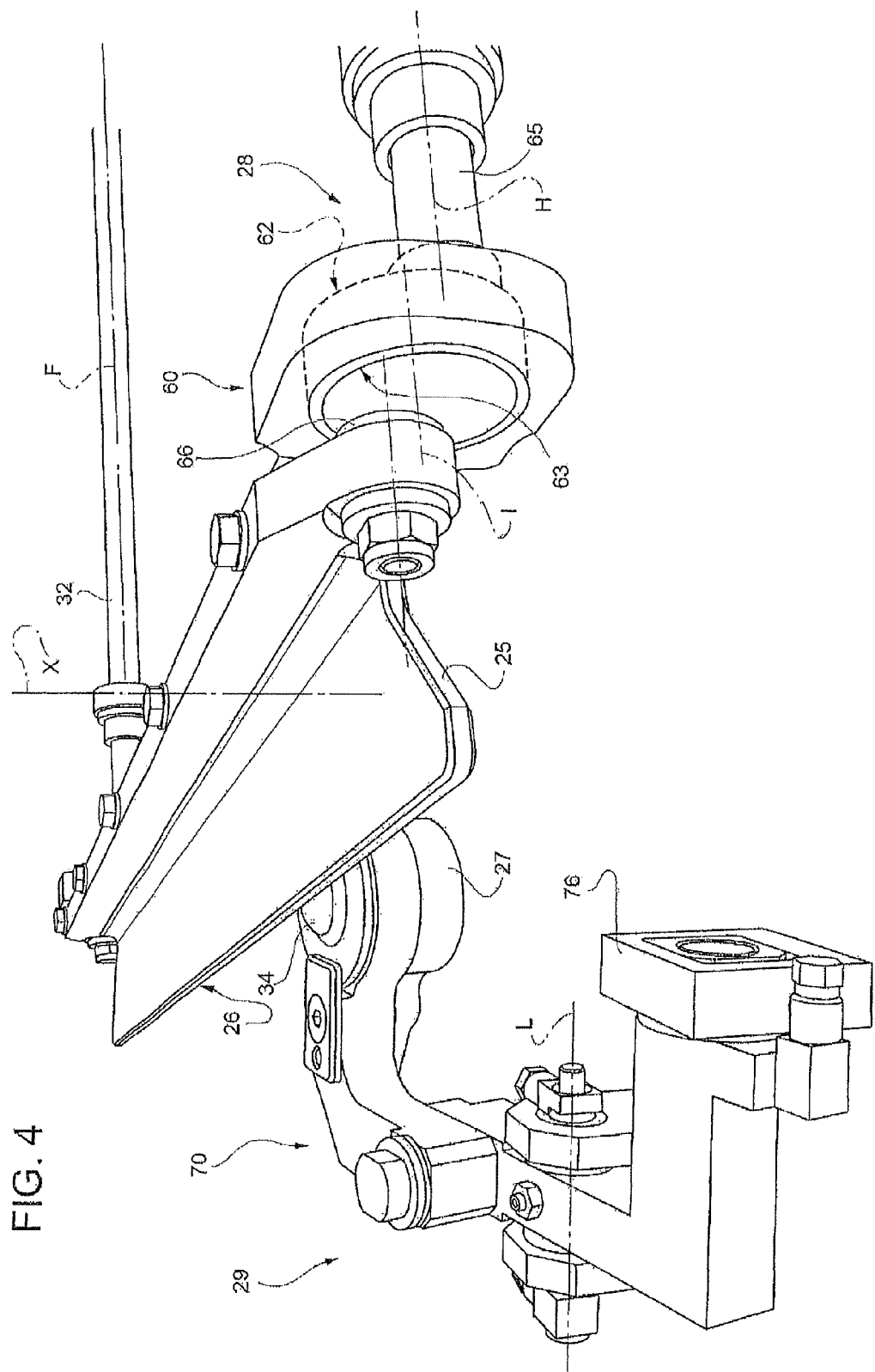
Figure 5:
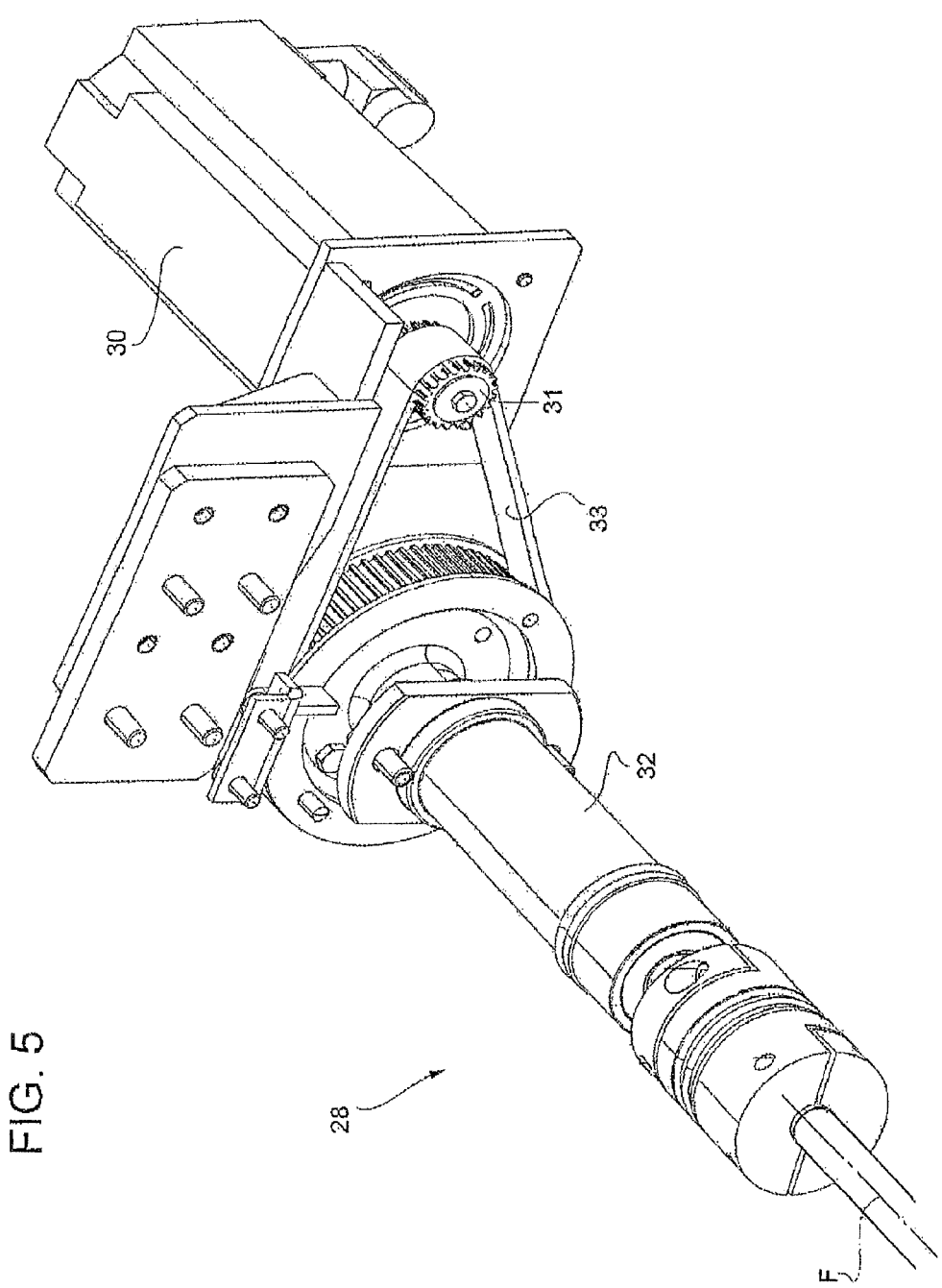

With particular reference to FIG. 4, cam 25 comprises a pair of pins 66, which engage respective surfaces 63 and extend about relative axes staggered from and parallel to respective axes I.

In this way, rod 60 is eccentrically mounted on shaft 32 and rod 65, and cam 25 is eccentrically mounted on rod 60.

Mechanism 29 comprises (FIG. 10):

- a lever 70 hinged to portion 10 of jaw 8a about axis L orthogonal direction Z, and carrying cam follower 27;
- a rod 71 parallel to direction Z and partly housed in a slidable manner within arm 11 of jaw 8a;
- an element 72 connected to rod 71 and adapted to cause the rotation of flaps 21 about respective axes C towards or away from each other; and
- a spring 74 interposed between an enlarged portion 79 of rod 71 and an abutting element 75 firmly housed within arm 11 of jaw 8a, and pre-loading rod 71 and element 72 on the opposite side of lever 70.

In greater detail, lever 70 is connected to a block 76, on the opposite side of axis L relative to cam follower 27.

Rod 71 comprises an axial end 77 housed within and connected to block 76 and an axial end 78, opposite to end 77, connected to element 72.

Enlarged portion 79 is interposed along direction Z between ends 77, 78.

Spring 74 is, in the embodiment shown, helical and extends parallel to direction Z.

Element 72 is housed within arm 11 of jaw 8a and substantially comprises:
- a bar 80 elongated along direction Z and connected to rod 71; and
- pair of appendices 81 protruding from bar 80 towards axis B and defining respective seats 82, 83 engaged by pins 24 of flaps 21.

Pins 24 are eccentrically mounted about axes C of relative flaps 21 and rotate integrally with flaps 21 about relative axes C.

In particular, seats 82, 83 are open on the opposite side of bar 80.

Seat 82 is arranged closer to lever 70 than seat 83.

Seat 82 comprises, proceeding from bar 80 towards the open side of seat 82 itself:
- a curved portion 84 elongated parallel to arm 11 and engaged by a stop element 85; and
- a prismatic portion 86 engaged by pin 24 of flap 21 closer to lever 70.

In particular, pin 24 engaging portion 86 of seat 82 is arranged below relative axis C.

Seat 83 is engaged by pin 24 of flap 21 farther from lever 70.

Seat 83 is U-shaped, in the embodiment shown.

In particular, pin 24 engaging seat 83 is arranged above relative axis C.

Figure 6:
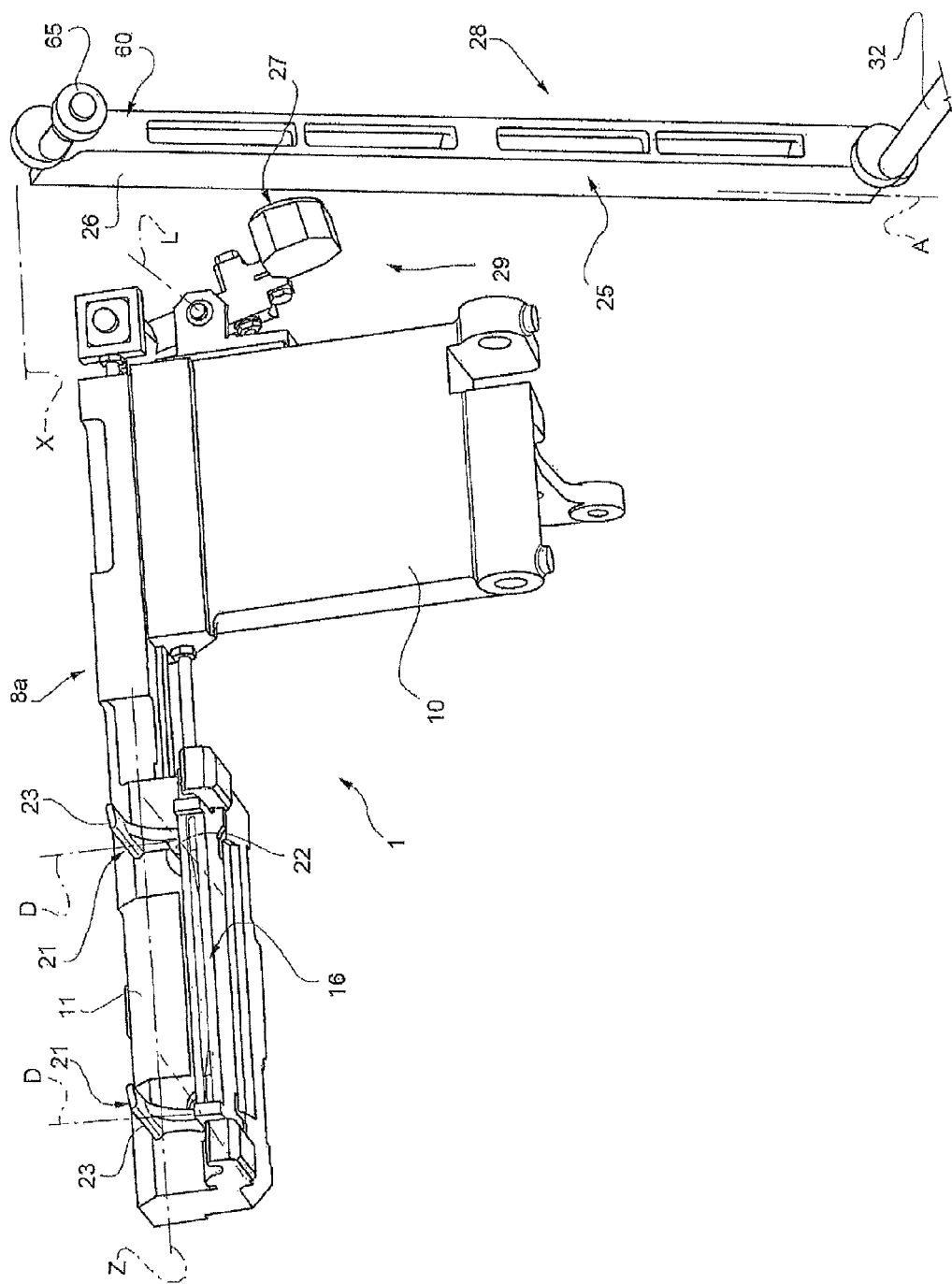
FIGS. 6 to 9 shows consecutive steps of the work-cycle of the unit of FIGS. 1 to 5.
Figure 7:
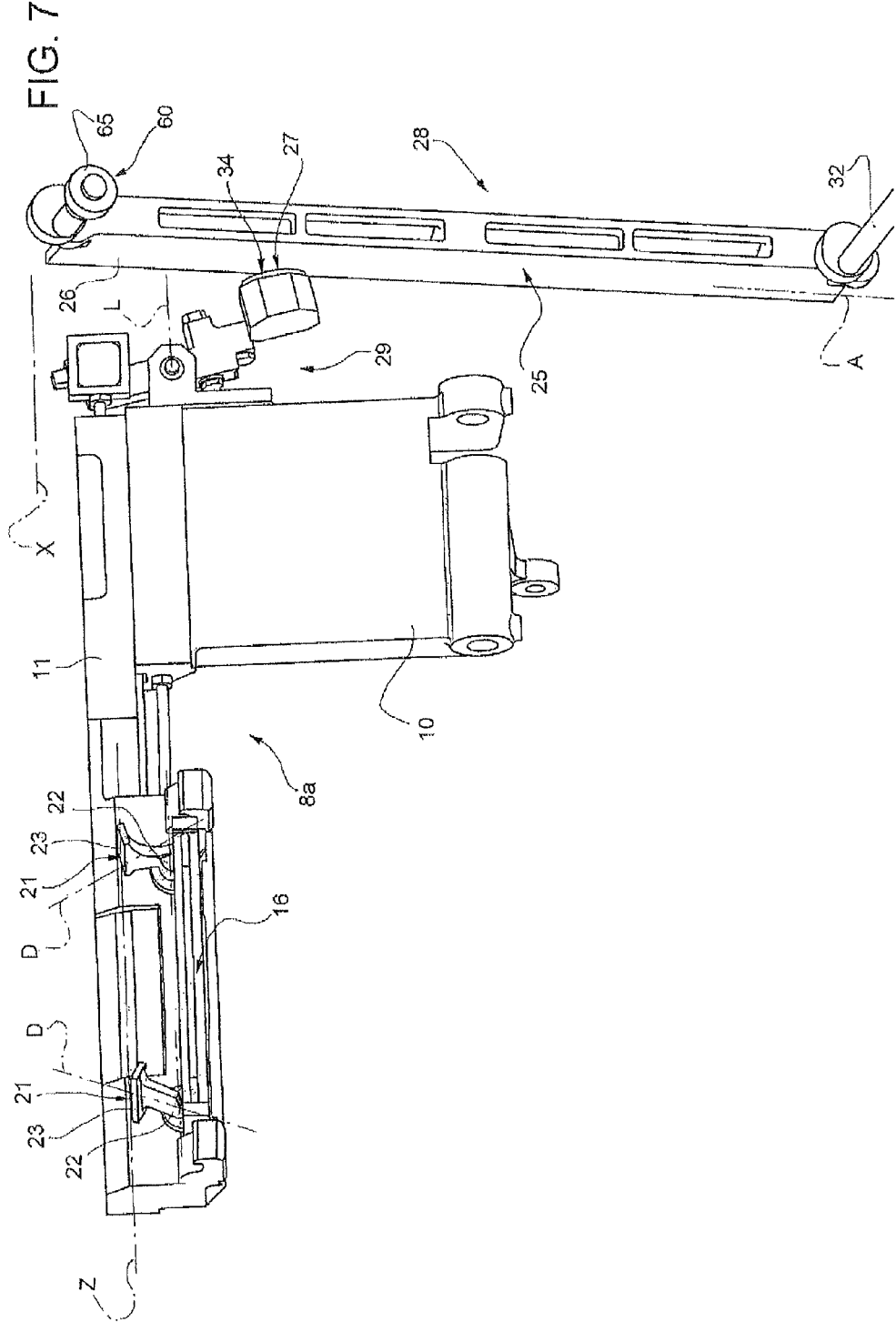
Figure 10:
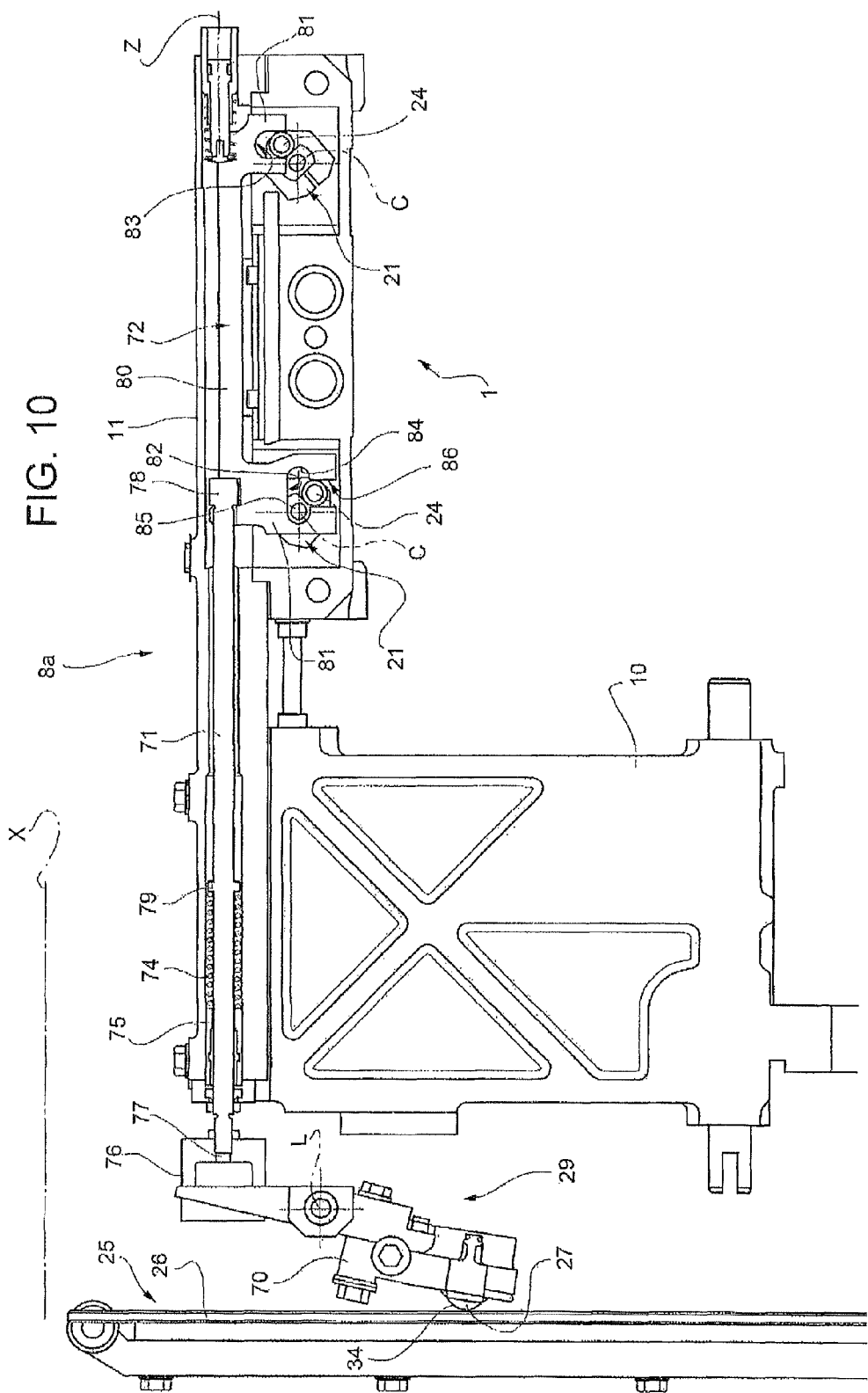
FIG. 10 shows further components of the unit of FIG. 1 in the position shown in FIG. 6.

As shown in FIGS. 6 and 10, when it is in the first position, cam 25 does not contact cam follower 27 (FIG. 7). In this situation, spring 74 pushes rod 71 and element 72 on the opposite side of lever 70 along direction Z up to when stop element 85 abuts against the edge of portion 84 of seat 82 closer to lever 70. As a result, flaps 21 are pre-loaded by spring 74 in the open position.

Figure 9:
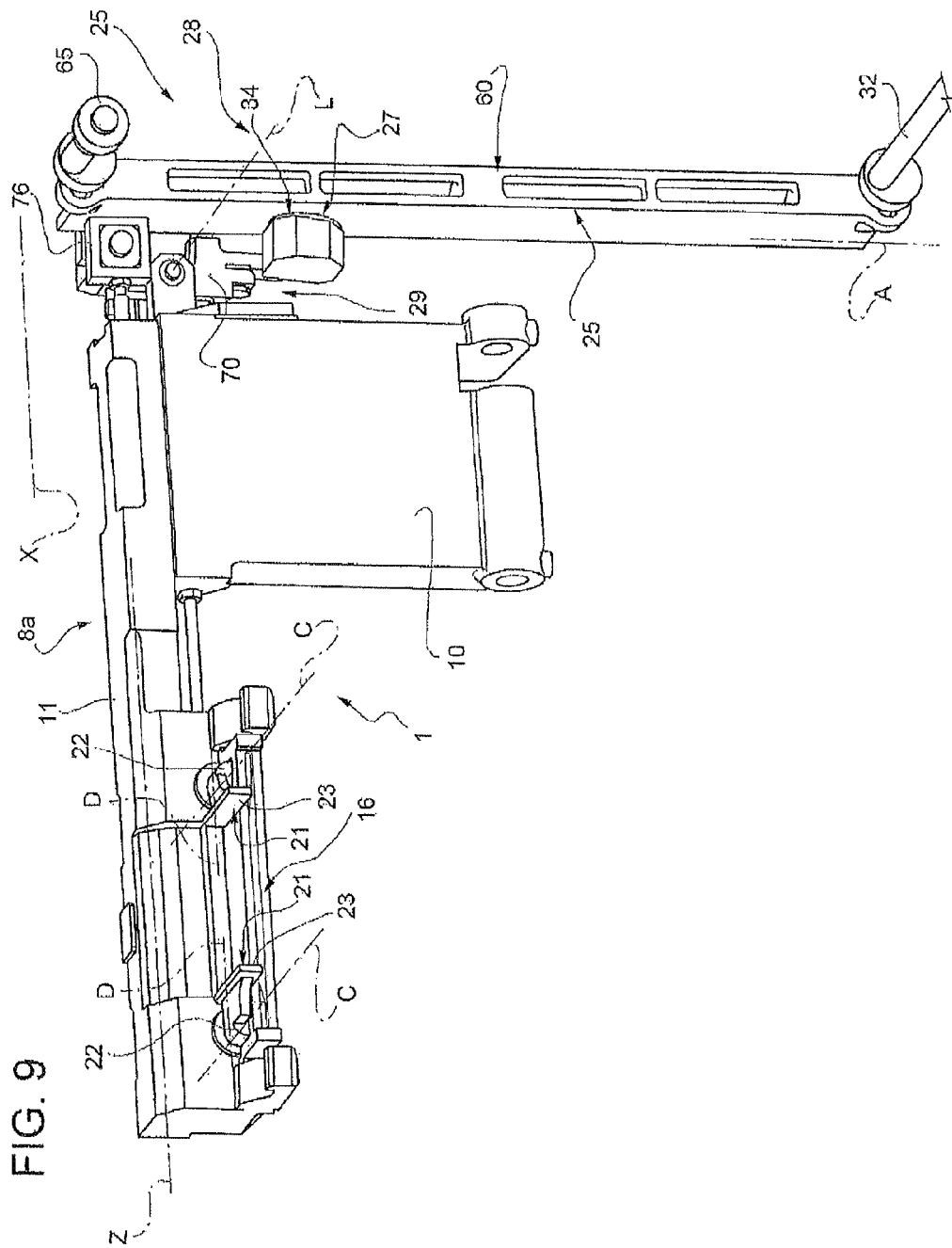

When cam 25 moves along direction X towards jaw 8a and contacts cam follower 27, lever 70 rotates about axis L anti-clockwise with respect to the orientation shown in FIG. 9. As a result, rod 71 and element 72 slide parallel to direction Z on the opposite side of flaps 21. This causes the rotation of pins 24 and, therefore, of flaps 21 about relative axes C and towards one another at first in the partly closed position and then in the open position.

Figure 8:
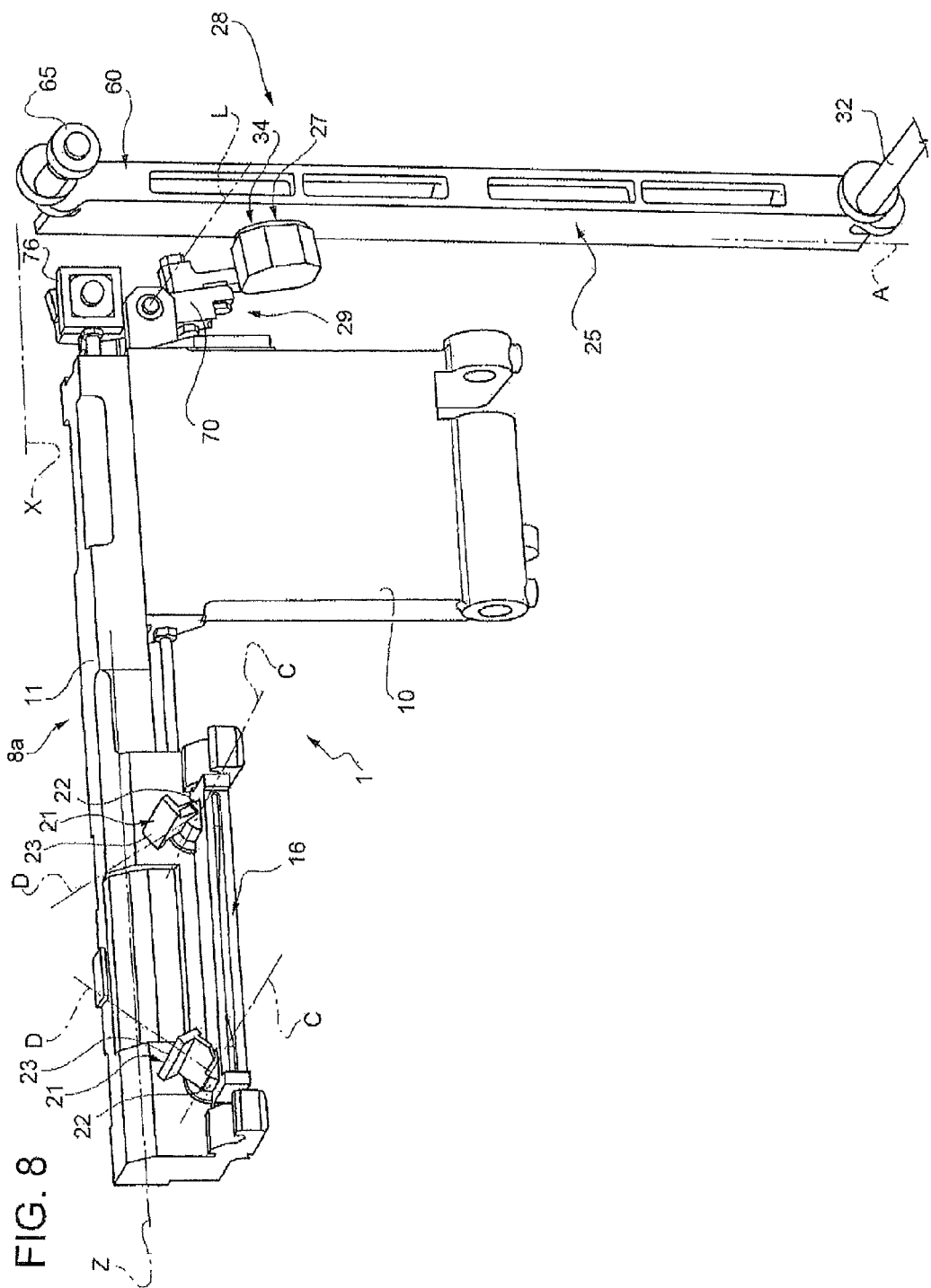

Cam follower 27 rotates together with jaw 8a about axis B and slides along direction Z, when flaps 21 move from the open position (FIG. 6) to the partly closed position (FIG. 8).

In other words, when flaps 21 move from the open position to the partly closed position, the centre of spherical surface 34 of cam follower 27 moves along a three-dimensional trajectory.

Differently, cam follower 27 only slides along direction X when flaps 21 move from the partly closed position (FIG. 8) to the fully closed position (FIG. 9), due to the fact that jaws 8a, 8b are set in the seal position during this movement.

Cam follower 27 comprises a spherical surface 34 (FIGS. 3, 4, 6, 7 and 10) contacting cam 25. In this way, cam follower 27 can remain in contact with surface 26 of cam 25 even when the centre of surface 34 moves along a three-dimensional trajectory as described above.

In actual use, tube 2, filled with the liquid food product, is fed along axis A and sealed along longitudinal sealing band 44.

In detail, as each assembly 6; 6' moves down onto relative slide 7, corresponding jaws 8a, 8b; 8a', 8b' are arranged in the seal position, so as to grip tube 2 with a downward vertical component of motion equal to the travelling speed of tube 2. At the same time, half-shells 20 reach the closed position.

More specifically, jaws 8a, 8b; 8a', 8b' of assembly 6; 6' are brought together to gradually deform tube 2 and flatten it at its cross section at which sealing device 14 seal the two superimposed portion of packaging material, thus forming bands 45, 46.

In detail, sealing device 14 of one assembly 6 seals package 3 at the bottom, and subsequently sealing device 14 of the other assembly 6 seals the top of package 3.

On nearing the bottom dead-center position of the downward travel of each forming assembly 6; 6', jaws 8a, 8b; 8a', 8b' move from the relative seal positions to the relative rest position and release formed package 3. Similarly, half-shells 20 move from the relative closed position to the relative open position.

Jaws 8a, 8b; 8a', 8b' remain in the respective rest positions and move upwards. On nearing the top dead-center position of the upward travel of each forming assembly 6; 6', jaws 8a, 8b; 8a', 8b' begin closing thus reaching at first the intermediate position and then the seal position by the time they begin moving down.

The movements of the two forming assemblies 6, 6' are obviously offset by a half cycle: forming assembly 6 travels upwards with jaws 8a, 8b open, at the same time as forming assembly 6' travels downwards with jaws 8a', 8b' closed, so as to avoid interference.

The movement of jaws 8a, 8b; 8a', 8b' from the relative rest positions and to the relative seal positions is superimposed to the movement of flaps 21 from relative open positions to the relative partly closed positions.

In greater detail, flaps 21:
- are arranged in the open position (FIGS. 6, 10 and 12) and move together with jaws 8a, 8b; 8a', 8b', when jaws 8a, 8b; 8a', 8b' move from the rest position to the intermediate position;
- move relative to jaws 8a, 8b; 8a', 8b' from the open position in the partly closed position (FIGS. 8 and 12) but not yet contact tube 2, when the jaws 8a, 8b; 8a', 8b' are in the intermediate position;
- remain in the partly closed position and move together with jaws 8a, 8b; 8a', 8b', when jaws 8a, 8b; 8a', 8b' move from the intermediate position to the seal position;
- contact tube 2 in the partly closed position before that jaws 8a, 8b; 8a', 8b' have reached the seal position, so as to control the shape and/or the orientation of tube 2 and in particular to prevent tube 2 from twisting about axis A;
- move relative to jaws 8a, 8b; 8a', 8b' from the partly closed position to the fully closed position (FIG. 9), after that jaws 8a, 8b; 8a', 8b' have reached the seal position, so as to form flaps 56; and
- move relative to jaws 8a, 8b; 8a', 8b' from the fully closed position to the open position, when jaws 8a, 8b; 8a', 8b' are still in the seal position.

Furthermore, directions D of flaps 21 and direction X define (FIG. 12):
- angle $\alpha_2$, when flaps 21 are in the partly closed position and jaws 8a, 8b are in the intermediate position;
- angle $\alpha_3$, when flaps 21 are in the fully closed position and form flaps 56 and jaws 8a, 8b are in the seal position; and
- angle $\alpha_1$ larger than angle $\alpha_2$, when flaps 21 are in the open position, after that sealing device 14 has formed sealing bands 45, 46, and jaws 8a, 8b are still in the seal position.

The operation of unit 1 and flaps 21 is described more in detail in the following with reference to jaws 8a, 8b and assembly 6 only, and starting from a configuration in which jaws 8a, 8b are in the rest position, cam 25 is in the first position (FIGS. 6, 10), stop element 85 contacts the end of curved portion closer to abutting element 75, and flaps 21 are elastically loaded by spring 74 in the open position.

More precisely, in this configuration, cam 25 is detached from cam follower 27 along direction X and spring 74 loads rod 71 and element 72 on the opposite side of lever 70, thus keeping flaps 21 in the open position.

When jaws 8a, 8b begin to move from the rest position to the intermediate position and then to the seal position, device 28 is actuated to move cam 25 from the first position to the second position along direction X and mechanism 29 move flaps 21 from the open position to the partly closed position.

In greater detail, motor 30 drives in rotation shaft 32 about axis F, thanks to the action of shaft 31 and belt 33.

Due to the fact that surfaces 61, 62 of rod 60 are eccentrically engaged by shaft 31 and rod 65, the rotation of shaft 32 about axis F causes the movement of rod 60 back and forth along axis A and along direction X.

Due to the fact that surfaces 63 of rod 60 are eccentrically engaged by pins 66 of cam 25, the above described movement of rod 60 results in the movement of cam 25 from the first position to the second position along direction X and towards jaw 8a, 8b.

Surface 26 of cam 25 at first contacts (FIG. 7) surface 34 of cam follower 27 and then causes the tilting of cam follower 27 and, then, of lever 70 about axis L (FIG. 8).

In detail, cam follower 27 is pushed towards flaps and block 76 is moved away from flaps 21 along direction Z.

As a result of the above movement of block 76, rod 71 and element 72 move along direction Z from jaw 8a towards abutting element 75, thus compressing spring 74.

The movement of element 72 along direction Z and towards abutting element 75 causes the rotation of pins eccentrically about respective axes C, thus displacing flaps 21 in the partly closed position.

Cam 25 is arrested in the second position (FIG. 8), so that also flaps 21 are arrested in the partly closed position.

At this stage, flaps 21 do not yet contact tube 2.

When jaws 8a, 8b move from the intermediate position to the seal position, flaps 21 remain in the partly closed position and contact tube 2 before that sealing device 14 form bands 45, 46, thus contributing in controlling the twisting of tube 2 about axis A.

It is important to stress that cam 25 pushes cam follower 27 along direction X when cam follower 27 is rotating together with jaw 8a about axis B.

Accordingly, as cam 25 moves from the first position to the second position along direction X, cam follower 27 moves along a three-dimensional trajectory and surface 34 remains in contact with surface 26, due to its spherical shape.

Afterwards, jaw 8a, 8b reach the seal position and form band 55 (56) of package 3, the volume of which is controlled by half-shells 20.

At the same time, device 28 further moves cam 25 from the second position to the third position (FIG. 9) along direction X, and mechanism 29 move flaps 21 towards one another from the partly closed position to the fully closed position.

In detail, cam 25 is arrested in the third position, so that flaps 21 are arrested in the fully closed position, thus forming flaps 56 of package 3.

At this stage, jaws 8a, 8b reach the seal position and device 28 moves back cam 25 from the third position to the first position.

In particular, cam 25 is moved back along direction X and on the opposite side of jaws 8a, 8b.

When cam 25 is again detached from cam follower 27, spring 74 extends on the opposite side of abutting element 75, thus thrusting also block 76, rod 71 and element 72 on the opposite side of abutting element 75 and towards flaps 21.

As a result, flaps 21 rotate away from each other about axes C up to the open position and lever 70 is tilted about axis L in such a way that cam follower 27 approaches cam 25.

Flaps 21 are arrested in the open position by the abutment of stop element 85 against the edge of curved portion 84 closer to abutting element 75 (FIG. 10).

At this stage, jaws 8a, 8b move back to the rest position.

The advantages of unit 1 and the method according to the present invention will be clear from the above description.

In particular, flaps 21 may be arranged in the partly closed position, which is arranged between the open position and the fully closed position.

In this way, on the one hand, flaps 21 may be set in the partly closed position in which they contact tube before that jaws 8a, 8b; 8a', 8b' reach the seal position.

On the other hand, flaps 21 are set in the open position after that jaws 8a, 8b; 8a', 8b' reach the seal position have formed sealing band 45, 46.

In other words, unit 1 features an angle $\alpha_2$—between the partly closed position and the fully closed position of flaps 21—smaller than angle $\alpha_1$—between the partly closed position and the fully closed position of flaps 21.

Accordingly, unit 1 is particularly suitable for forming packages 3 from a packaging material having a particular high stiffness and by using sealing device 14 formed by sonotrode 16 and anvil 17.

As a matter of fact, even with a particularly stiff packaging material stretched for a particularly long stroke by jaws 8a, 8b; 8a', 8b', larger angle $\alpha_1$ allows to avoid interference between flaps 56 of formed package 3 and flaps 21.

On the other side, flaps 21, when arranged in the partly closed position, contact tube 2, so contributing in controlling the twisting of tube 2 about axis A.

In this way, the risk that this twisting could impair the overlapping of opposite edges of tube 2 at sealing band 44 is dramatically reduced.

Furthermore, the Applicant has found that the reduced value of angle $\alpha_2$ reduces the tendency of tube 2 to axially collapse. In particular, the Applicant has found that the reduced value of angle $\alpha_2$ results the risk of cracking the areas of the package 3 close to the sealing bands 45, 46 and/or bending the opposite lateral edges of sealing bands 45, 46.

Finally, surface 34 cooperating with cam 25 is spherical.

In this way, cam follower 27 can remain in contact with surface 26 of cam 25, even when the centre of surface 34 moves along a three-dimensional trajectory.

As a result, surface 34 remains in contact with surface 26 of cam 25, when cam follower 27:
  both rotates about axis B together with jaws 8a; 8a' moving from the intermediate position and the seal position; and
  translates along direction X by cam 25 moving from the first position to the second position.

Clearly, changes may be made to unit 1 and the method as described herein without, however, departing from the scope of the accompanying Claims.

In particular, flaps 21 could move between relative open positions, partly closed position and fully closed positions by using a pneumatic cylinder or a hydraulic system.

Furthermore, sealing device 14 could comprise, instead of sonotrode 16 and anvil 17, a heating induction system.

The invention claimed is:

1. A packaging unit for producing sealed packages from a tube of a sheet packaging material fed, in use, along a feed path having a first axis;

each said package comprising a pair of axially opposite sealing bands, a main body and two axially opposite pairs of folded flaps projecting on opposite lateral side of said main body;

said unit comprising:

jaw means movable cyclically along said path between a seal position in which they grip and seal said tube to form said sealing bands, and a rest position in which they are detached from said tube; and folding flaps fitted movably to said jaw means;

said folding flaps being movable between:

an open position in which they are detached, in use, from said tube; and a fully closed position in which they cooperate, in use, with said tube for forming, in each said package, one pair of said folded flaps;

said jaw means being also cyclically movable in a plurality of intermediate positions, which are set between said rest position and said seal position;

wherein said folding flaps are movable relative to said jaws means into a partly closed position, which is arranged between said open position and said fully closed position;

said folding flaps being movable relative to said jaw means into said partly closed position, when said jaw means are set, in at least one of said intermediate positions.

2. The packaging unit of claim 1, wherein said folding flaps are movable, when set in said open position, together with said jaws means, when said jaw means move, in use, from said rest position to said at least one of said intermediate positions.

3. The packaging unit of claim 2, wherein said folding flaps are movable, when set in said partly closed position, together with said jaw means up to a position in which said folding flaps contact, in use, said tube so as to control the orientation and/or the shape of said tube before that said jaw means reach, in use, said seal position.

4. The packaging unit of claim 1, wherein said folding flaps are movable between said partly closed and said fully closed position and/or between said fully closed position and said open position, when said jaw means are set, in use, in said seal position.

5. The packaging unit of claim 1, wherein said folding flaps stop in said partly closed position.

6. The packaging unit of claim 1, wherein said folding flaps extend along respective first directions;

each first direction and a second direction orthogonal to said first axis defining a first angle ranging between 50 and 56 degrees, when said folding flaps are arranged in said partly closed position;

each said first direction and said first axis defining a second angle greater than said first angle, when said folding flaps are arranged in said open position;

said second angle ranging between 77 and 82 degrees.

7. The packaging unit of claim 6, wherein said cam is adjustable in a second direction transversal to said path.

8. The packaging unit of claim 1, wherein said unit further comprises a cam cooperating with a cam follower which is operatively connected to said folding flaps and hinged to said jaw means for moving said folding flaps from at least one of towards the remaining two of said open position, said partly closed position and said fully closed position.

9. The packaging unit of claim 8, wherein said cam follower has an at least partly spherical surface cooperating with said cam.

10. The packaging unit of claim 8, comprising:

a lever hinged about a second axis to said jaw means;

at least one movable element operatively connected to said folding flaps and carried by said jaw means;

a spring interposed between said jaw means and said element and pre-loading said element towards a position in which said movable element keeps, in use, said folding flaps in said at least one of said open position, said partly closed position and said fully closed position; and said lever being connected, on one of said second axis, to said cam follower and being operatively connected, on the other side of said second axis, to said element.

11. The packaging unit of claim 1, wherein each of the folding flaps includes a plate configured to contact and shape the tube when the folding flaps are in the partly closed position, wherein the plate contacts the tube before the jaws are in the sealing position.

12. A method of producing sealed packages from a tube of a sheet packaging material fed along a feed path having a first axis; each said package comprising a pair of axially opposite sealing bands, a main body and two axially opposite pairs of folded flaps projecting on opposite lateral side of said main body;

said method comprising:

controlling jaw means between a rest position in which they are detached from said tube, and a seal position in which they grip and seal said tube to form said sealing bands; and controlling folding flaps between an open position in which they are detached from said tube and a fully closed position in which they fold said tube, so as to form one pair of said folded flaps;

said controlling of the jaw means comprising moving said jaw means from said rest position to a plurality of intermediate positions, which are set between said rest position and said seal position;

wherein said controlling of the folding flaps comprises moving said folding flaps relative to said jaw means into a partly closed position which is arranged between said open position and said fully closed position, when said jaw means are set in at least one of said intermediate positions.

13. The method of claim 12, wherein said controlling of said folding flaps comprises:

moving said folding flaps together with said jaw means during said moving said jaw means from said rest position to said at least one of said intermediate positions;

keeping said folding flaps into said open position during said moving said jaw means from said rest position to an intermediate position; and moving said folding flaps relative to said jaw means and from said open position to said partly closed position, when said jaw means are in said at least one of said intermediate positions.

14. The method of claim 13, wherein said controlling of said jaw means comprises moving said jaw means from said at least one of said intermediate positions to said seal position;

said controlling of said folding flaps comprising moving said folding flaps together with said jaw means up to a position in which said folding flaps contact said tube before said jaw means reach said seal position, during said moving said jaw means from said intermediate position to said seal position.

15. The method of claim 12, wherein said of controlling of said folding flaps comprises moving said folding flaps from said partly closed position to said fully closed position and/or between said fully closed position to said open position, when said jaw means are set in said seal position.

16. The method of claim 12, comprising arresting said folding flaps into said partly closed position.

17. A packaging unit for producing a formed package from a tube of a sheet packaging material fed along a feed path having a first axis;
   the formed package comprising a pair of axially opposite sealing bands, a main body and two axially opposite pairs of folded flaps projecting on opposite lateral sides of the main body;
   the packaging unit comprising:
   jaws configured to move between a seal position in which the jaws grip and seal the tube to form the sealing bands, and a rest position in which the jaws are out of contact with the tube;
   folding flaps configured to move relative to the jaws;
   a cam configured to move the folding flaps between an open position in which the folding flaps are out of contact with the tube, a fully closed position in which the folding flaps contact the tube for forming one pair of the folded flaps, and a partly closed position between the open position and the fully closed position; and
   the cam being configured to move the folding flaps relative to the jaws into the partly closed position when the jaws are at an intermediate position between the seal position and the rest position.

18. The packaging unit of claim 17, wherein the packaging unit further comprises a cam follower operatively connected to the folding flaps and hinged to one jaw of the jaws, the cam contacting the cam follower to move the folding flaps between the open position and the fully closed position, the folding flaps moving relative to the jaws.

19. The packaging unit of claim 18, wherein each of the folding flaps includes a plate configured to contact and shape the tube when the folding flaps are in the partly closed position, wherein the plate contacts the tube before the jaws are in the sealing position.

\* \* \* \* \*